United States Patent
Eberling

[19]

[11] Patent Number: 6,062,652
[45] Date of Patent: May 16, 2000

[54] PNEUMATIC SYSTEM TO FAST FILL TRAILER RESERVOIRS

[75] Inventor: Charles E. Eberling, Wellington, Ohio

[73] Assignee: AlliedSignal Truck Brake Systems Co., Elyria, Ohio

[21] Appl. No.: 09/019,617

[22] Filed: Feb. 6, 1998

[51] Int. Cl.[7] ............................. B60T 13/00; B60T 15/38
[52] U.S. Cl. .................................... 303/7; 303/64
[58] Field of Search ................... 303/86, 85, 78, 303/64, 65, 7

[56] References Cited

U.S. PATENT DOCUMENTS

| | | | |
|---|---|---|---|
| 3,892,444 | 7/1975 | Durling | 303/7 |
| 3,909,069 | 9/1975 | Durling | 303/7 |
| 4,076,328 | 2/1978 | Horowitz | 303/50 |
| 4,472,001 | 9/1984 | Fannin | 303/9 |
| 4,629,256 | 12/1986 | Fannin | 303/8 |
| 5,226,692 | 7/1993 | Eberling | 303/8 |
| 5,251,967 | 10/1993 | Eberling | 303/7 |
| 5,322,353 | 6/1994 | Wallestad | 303/7 |
| 5,340,212 | 8/1994 | Latvala | 303/7 |

*Primary Examiner*—Robert J. Oberleitner
*Assistant Examiner*—Robert A. Siconolfi

[57] ABSTRACT

An pneumatic system (10) for a tractor trailer truck (6) which increases compressed air flow to the trailer reservoir (52) whenever the tractor (7) is parked. This decreases the time it takes to charge the trailer reservoir (52) to a sufficient pressure to release the trailer brakes allowing the truck (6) to move. In normal over the road operation the trailer reservoir (52) is charged through a tractor protection control valve (14) which is mounted on the tractor dash. However when the tractor (7) is parked and a tractor park valve (12) which is mounted on the tractor dash is pulled out compressed air from the tractor secondary reservoir (42) is delivered with an increased flow rate to the trailer supply line (50). When the tractor park control valve (12) is pushed in releasing the tractor parking brake the trailer charging reverts back to charging through the dash mounted tractor protection control valve (14). Pulling the tractor protection control valve (14) out vents the trailer supply line (50) in both the fast and normal charge mode.

10 Claims, 3 Drawing Sheets

PNEUMATIC SYSTEM TO FAST FILL TRAILER RESERVOIRS

BACKGROUND OF THE INVENTION

1. Field of the Invention

This invention relates to a pneumatic system for a heavy vehicle and more particularly to a control system to fast fill trailer reservoirs with the tractor parked.

2. Description of Prior Art

The trailer reservoirs are normally filled during over the road operation and when parked by a pneumatic circuit through a tractor protection control valve which is mounted on the tractor dash.

SUMMARY OF THE INVENTION

The pneumatic system of the present invention fills the trailer reservoirs whenever the trailer is parked through a pneumatic circuit wherein the flow path is not through the tractor protection control valve and which has an increased flow capacity. This permits faster charging of the trailer reservoirs when the tractor is parked. Whenever the tractor protection control valve is in the charge position, being pushed in, and the tractor control park valve is in the parking brakes applied position, being pulled out, a pilot signal is applied to a pilot operated pneumatic valve to deliver tractor reservoir compressed air with increased flow through the pilot operated relay valve to the trailer reservoir supply line. Pushing the tractor park control valve in, to the over the road position, causes the delivery of the signal to the pilot operated relay valve to be exhausted thereby causing the pneumatic trailer charging system to revert back to normal flow through the tractor protection control valve, which is mounted on the tractor dash, for charging of the trailer reservoirs. Pulling out the tractor protection control valve vents the trailed supply line in both the fast and normal over the road charging modes.

BRIEF DESCRIPTION OF DRAWINGS

For a better understanding of the invention reference may be had to the preferred embodiments exemplary of the inventions shown in the accompanying drawings in which.

DETAILED DESCRIPTION OF THE PREFERRED EMBODIMENTS

Figure 1:
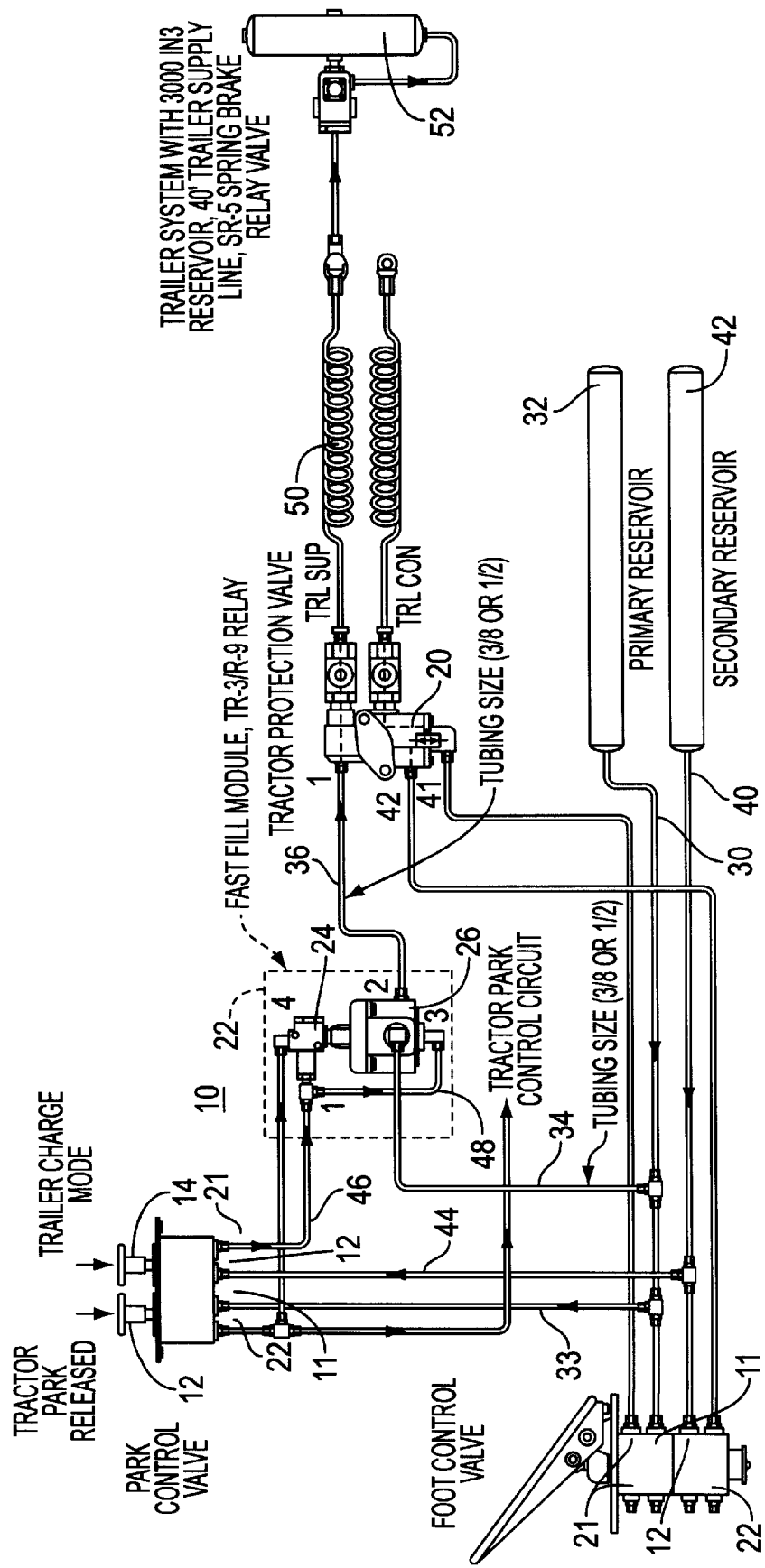
FIG. 1 is a diagrammatic illustration of a portion of a pneumatic system for a tractor and trailer according to the present invention operating in the normal over the highway mode.

Referring now to the drawings there is shown an improved pneumatic system 10 used on a tractor trailer truck 6 for charging a trailer reservoir 52. Truck 6 consists of a tractor 7 which tows a trailer 8. Tractor 7 includes a source of compressed air which is supplied to a reservoir 52 mounted on trailer 8 for operating the pneumatic brakes of trailer 8.

Figure 2:
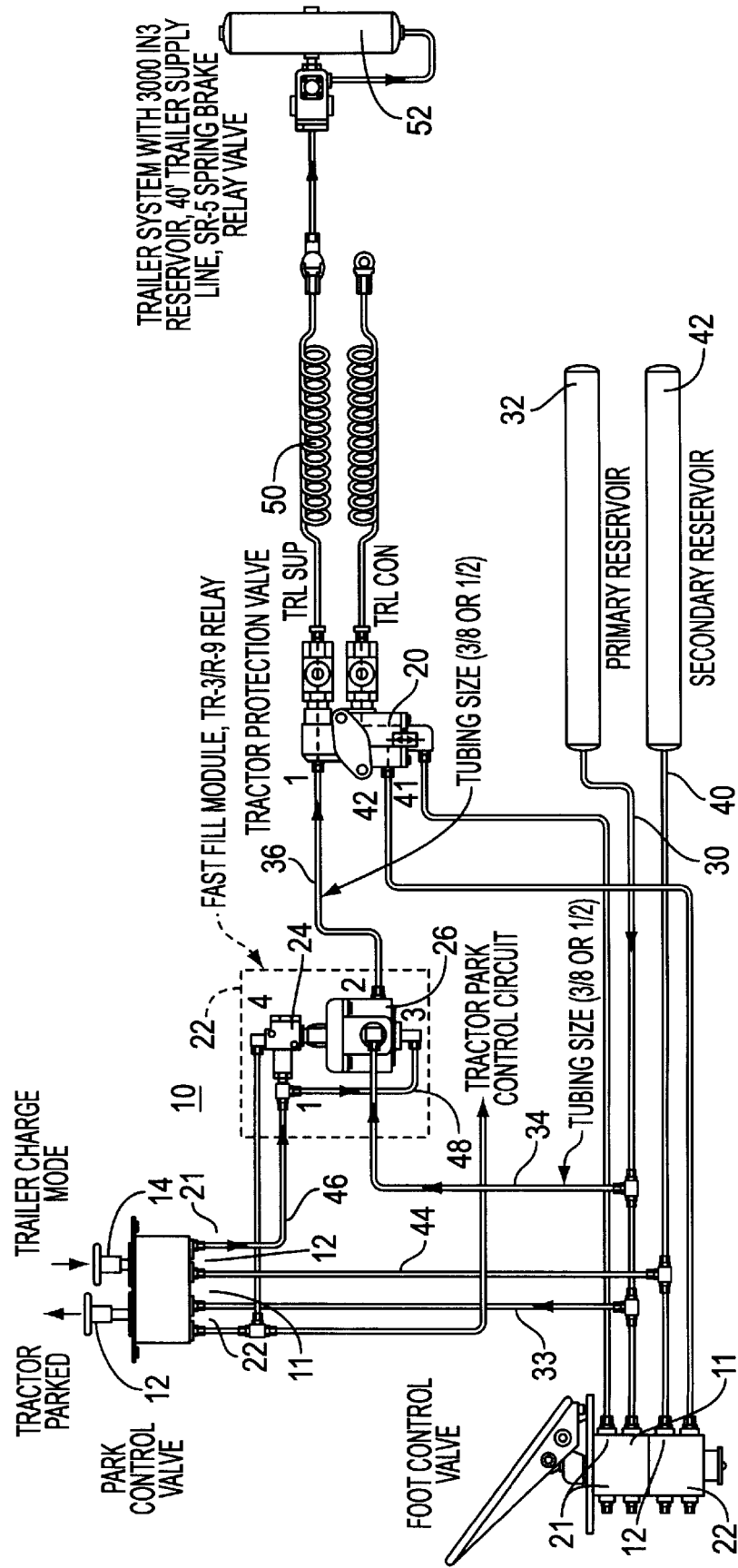
FIG. 2 is a diagrammatic illustration of a portion on a pneumatic system for a tractor and trailer according to the present invention operating in the parked fast fill mode; and, FIG. 3 is an illustration of a tractor and trailer which can use the present invention.
Figure 3:
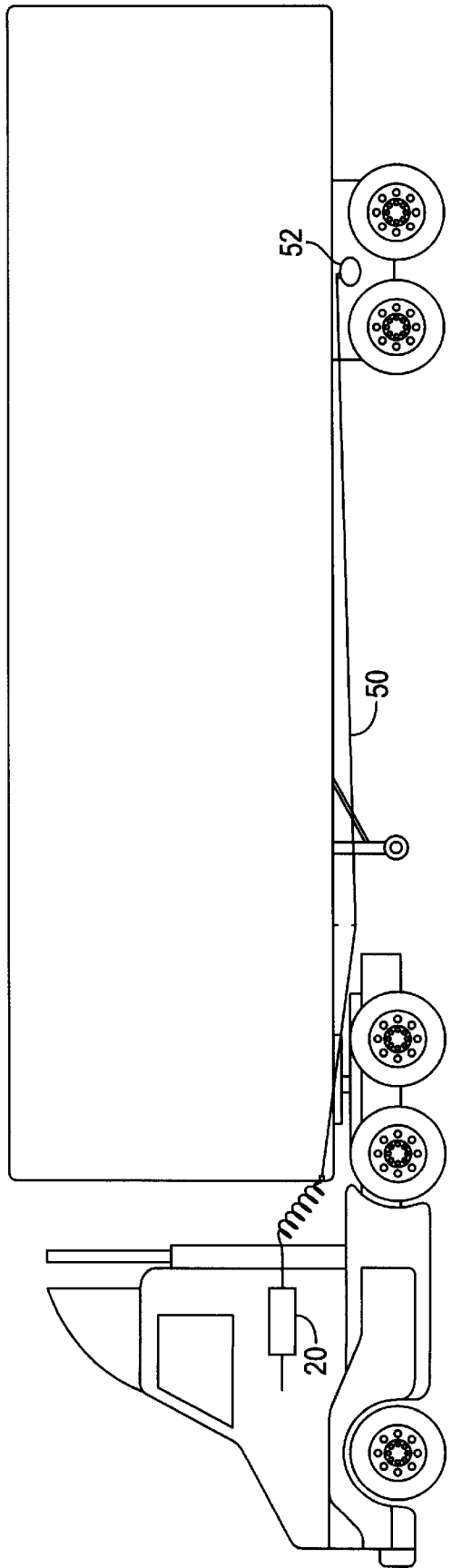

Mounted on the dash of the tractor 7 are a tractor park control valve 12 and a tractor protection control valve 14. Tractor park control valve 12 and tractor protection control valve 14 are push/pull operated valves. When tractor park control valve 12 is pushed in, as shown in FIG. 1, a pneumatic signal from a primary tractor supply reservoir line 30 is fed to a tractor park control circuit for releasing the tractor parking brake. When tractor park control valve 12 is pulled out, as shown in FIG. 2 the pneumatic signal to the tractor park control circuit is removed and the tractor parking brakes are applied.

A primary supply reservoir 32 and a secondary supply reservoir 42 are supplied with compressed air from an air compressor which is driven by the tractor engine. The primary reservoir 32 and the secondary reservoir 42 which are mounted on the tractor 7 provide the compressed air source for operating the various tractor pneumatic circuits. The trailer reservoir 52 is mounted on the trailer 8 and when charged provides a source of pneumatic power for operating the trailer brakes. Compressed air is supplied to the trailer reservoir 52 through a trailer supply line 50. The trailer brakes are spring loaded to be applied and before they can be released the pressure in the trailer supply reservoir must reach a specific level. During operation the trailer reservoir 52 receives compressed air from the primary reservoir 32 or the secondary reservoir 42 which are mounted on the tractor 7.

The improved pneumatic system 10 for a tractor trailer truck 6 increases compressed air flow to the trailer reservoir 52 whenever the tractor is parked. This decreases the time it takes to charge the trailer reservoir 52 to a sufficient pressure to release the trailer brakes allowing the tractor trailer truck to move. In normal over the road operation the trailer reservoir 52 is charged through the tractor protection control valve 14 which is mounted on the tractor dash and is connected to a supply line 40 from the secondary reservoir 42. However when the tractor 7 is parked and the tractor park control valve 12, which is mounted on the tractor dash, is pulled out compressed air from the tractor primary reservoir 32 is delivered with an increased flow rate to the trailer supply line 50. When the tractor park control valve 12 is pushed in, releasing the tractor parking brakes, the trailer charging reverts back to charging through the dash mounted tractor protection control valve 14. Pulling the tractor protection control valve 14 out vents the trailer supply line 50 in both the fast and normal charge mode.

Actual times to fill the trailer reservoir to 60 psi and 90 psi with the prior art pneumatic system and with the disclosed fast fill pneumatic system are shown in the following table.

| ACTUAL TRAILER RESERVOIR FILL TIMES (SECONDS) | | | | |
| --- | --- | --- | --- | --- |
| SYSTEM | TUBING SIZE | TRAILER SUPPLY LINE | 0–60 PSI CHARGE | 0–90 PSI CHARGE |
| PRIOR ART | 3/8 | 3/8 | 61.6 | 92.2 |
| FAST FILL | 1/2 | 1/2 | 36.5 | 65.7 |

In normal over the road operation the trailer reservoir 52 is filled from the secondary reservoir 42 along a flow path through connecting pneumatic lines 40, 44, 46, 48 and 36 and from the primary reservoir 32 along a flow path through connecting pneumatic lines 30, 33, 46, 48 and 36. Pneumatic supply line 36 connects to a tractor protection valve 20. The output of tractor protection valve 20 is connected to the trailer supply line 50.

When the tractor is parked the trailer reservoir 52 is filled from the primary reservoir 32 along a flow path through connecting pneumatic lines 30, 34 and 36. Pneumatic supply line 36 connects to the tractor protection valve 20. The output of tractor protection valve 20 is connected to the flexible trailer supply line 50 which through an appropriate connection attaches to the trailer reservoir 52.

A fast fill module 22 which comprises a pilot operated inversion valve 24 and a three way relay valve 26 is disposed in the pneumatic connections between the trailer reservoir 52 and the tractor compressed air supply from primary reservoir 32 and secondary reservoir 42. The fast fill module 22 is responsive to the position of the tractor park control valve 12 and the tractor protection control valve 14 and determines when the trailer reservoir 52 will be charged through the tractor protection control valve 14 or through the faster charging pneumatic connection through line 34. When the tractor protection control valve 14 is pushed in and the tractor park control valve 12 is pulled out charging of the trailer reservoir 52 is through the fast fill line 34. When the tractor protection control valve 14 is pushed in and the tractor park control valve 12 is also pushed in charging of the trailer reservoir 52 is through the tractor protection control valve 14. When the tractor protection control valve 14 is pulled out the trailer reservoir 52 is not charged and line 36 is vented to atmosphere.

I claim:

1. A pneumatic system for a heavy tractor and trailer truck comprising:
    a compressed air source mounted on the tractor;
    a first pneumatic connection for charging a compressed air reservoir on the trailer, said first pneumatic connection being made through a tractor protection control valve mounted on the tractor dash that is capable of shutting off supply air to the trailer compressed air reservoir;
    a second pneumatic connection for charging the compressed air reservoir on the trailer which when used can charge the trailer compressed air reservoir at a faster rate than said first pneumatic connection; and
    control means for activating said pneumatic connection when said tractor is parked and for activating said first pneumatic connection when said tractor is not parked.

2. A pneumatic system as claimed in claim 1 comprising:
    tractor parking brakes responsive to positioning of a tractor park control valve; and,
    said tractor park valve mounted on the tractor dash movable between a pulled out position wherein the tractor parking brakes are applied and a pushed in position wherein the tractor parking brakes are released.

3. A pneumatic system as claimed in claim 2 herein said control means is disposed between said tractor compressed air source and said trailer compressed air reservoir and being responsive to the positions of said trailer park control valve and said tractor protection control valve for supplying compressed air to said trailer compressed air reservoir at a first rate when said tractor protection control valve is pushed in and said trailer park control valve is pushed in and for supplying compressed air to said trailer compressed air reservoir at a second faster rate when said tractor protection control valve is pushed in and said trailer park control valve is pulled out and for interrupting the flow of compressed air to said trailer compressed air reservoir when said tractor protection control valve is pulled out.

4. A pneumatic system for a tractor trailer truck comprising:
    a compressed air source;
    a tractor parking brake means which is spring loaded on, to brake the tractor, and which is released when a compressed air signal is applied;
    a tractor park control valve mounted on the dash of said tractor and being movable between a pushed-in position when the compressed air signal is applied to release said tractor parking brake and a pulled-out position wherein the compressed signal is not applied and said tractor parking brakes are on;
    a trailer supply line for supplying compressed air from said tractor to a reservoir mounted on said trailer;
    a first pneumatic connection which is connectable from said compressed air source to said trailer supply line for charging the reservoir mounted on said trailer;
    a second pneumatic connection which is connectable from said compressed air source to said trailer supply line for charging the reservoir mounted on said trailer at a faster rate than said first pneumatic connection;
    relay means responsive to said tractor park control valve making said first pneumatic connection when said tractor park control valve is in the pushed-in position and for making said second pneumatic connection when said tractor park control valve is in the pulled-out position.

5. A pneumatic system for a tractor trailer truck as claimed in claim 4 comprising:
    a tractor protection control valve mounted on the dash of said tractor and forming part of said first pneumatic connection and being movable between a pulled out position and a pushed in position; and,
    said relay means also being responsive to said tractor protection control valve for interrupting said first pneumatic connection and said second pneumatic connection from said trailer supply line when said tractor protection control valve is pulled out.

6. A pneumatic system for a tractor trailer truck as claimed in claim 4 wherein said compressed air source comprises a primary reservoir and a secondary reservoir mounted on the tractor.

7. A pneumatic system for heavy tractors which tow trailers comprising:
    a tractor compressed air reservoir mounted on said tractor;
    a trailer compressed air reservoir mounted on said trailer;
    a trailer supply line from said tractor to said trailer for carrying compressed air to said trailer compressed air reservoir;
    a trailer park control valve, mounted on the tractor dash, movable between a pushed-in position and a pulled-out position;
    a tractor protection control valve, mounted on the tractor dash, movable between a pushed-in position and a pulled-out position; and pneumatic control means disposed between said tractor compressed air reservoir and said trailer supply line and being responsive to the positions of said trailer park control valve and said tractor protection control valve for supplying compressed air to said trailer supply line at a first rate when said tractor protection control valve is in the pushed-in position and said trailer park control valve is in the pushed-in position and for supplying compressed air to said trailer supply line at a second faster rate when said tractor protection control valve is in the pushed-in position and said trailer park control valve is in the pulled-out position and for interrupting the flow of compressed air to said trailer supply line when said tractor protection control valve is in the pulled-out position.

8. A pneumatic system for heavy tractors which tow trailers as claimed in claim 7 wherein said tractor compressed air reservoir comprises a primary supply reservoir and a secondary supply reservoir.

9. A pneumatic system as claimed in claim 1 wherein said control means automatically activates said first pneumatic connection when the tractor parking brakes are applied and automatically activates said second pneumatic connection when the tractor parking brakes are not applied.

10. A pneumatic system as claimed in claim 1 wherein said tractor protection control valve automatically shuts off supply air to the trailer compressed air reservoir in response to low pressure from the tractor compressed air source.

* * * * *